United States Patent [19]

Dechene

[11] Patent Number: 4,584,001
[45] Date of Patent: Apr. 22, 1986

[54] MODULAR OXYGEN GENERATOR

[75] Inventor: Fernand J. Dechene, New Britain, Conn.

[73] Assignee: VBM Corporation, Louisville, Ky.

[21] Appl. No.: 710,138

[22] Filed: Mar. 11, 1985

Related U.S. Application Data

[63] Continuation of Ser. No. 521,711, Aug. 9, 1983, abandoned.

[51] Int. Cl.$^4$ ............................................. B01D 53/04
[52] U.S. Cl. ........................................ 55/162; 55/163; 55/179; 55/387; 55/389
[58] Field of Search .................... 55/25, 26, 58, 62, 68, 55/74, 75, 160–163, 179, 180, 208, 316, 387, 389

[56] References Cited

U.S. PATENT DOCUMENTS

| | | | |
|---|---|---|---|
| 2,625,237 | 1/1953 | Gribler et al. | 55/179 X |
| 3,155,471 | 11/1964 | Schymik et al. | 55/179 X |
| 3,164,452 | 1/1965 | Westeren et al. | 55/179 X |
| 3,258,899 | 7/1966 | Coffin | 55/179 X |
| 3,304,623 | 2/1967 | Reiss et al. | 55/179 X |
| 3,323,291 | 6/1967 | Kern | 55/179 X |
| 3,507,097 | 4/1970 | Crowley et al. | 55/163 X |
| 3,543,482 | 12/1970 | Foster | 55/179 X |
| 3,922,149 | 11/1975 | Ruder et al. | 55/25 X |
| 4,231,768 | 11/1980 | Seibert et al. | 55/179 |
| 4,272,265 | 6/1981 | Snyder | 55/161 X |
| 4,302,224 | 11/1981 | McCombs et al. | 55/160 |
| 4,342,573 | 8/1982 | McCombs et al. | 55/179 X |
| 4,373,938 | 2/1983 | McCombs | 55/179 X |
| 4,378,982 | 4/1983 | McCombs | 55/179 X |

*Primary Examiner*—Robert Spitzer
*Attorney, Agent, or Firm*—Fay, Sharpe, Fagan, Minnich & McKee

[57] ABSTRACT

A gas fractioning apparatus includes a housing (A) in which various gas separation components and modules are located. A gas distribution module (B) which includes components for handling and distributing incoming gas to be separated is mechanically mountable within the housing. A control module (C) which includes the appropriate control components for controlling the gas separation is similarly mountable within the housing. An oxygen outlet assembly (D) which includes the fluid handling components for handling the separated oxygen is mounted with the control module in the housing. A bed module (E) which physically separates oxygen from other air components is mechanically mountable within the housing. A mechanical mounting assembly (F) removably mounts the modules within the housing. An electrical connection assembly (G) provides electrical connection between the electrical components of at least the control and distribution modules. A fluid connection assembly (H) provides fluid connection between fluid handling components of at least the distribution, bed, and oxygen outlet modules.

11 Claims, 4 Drawing Figures

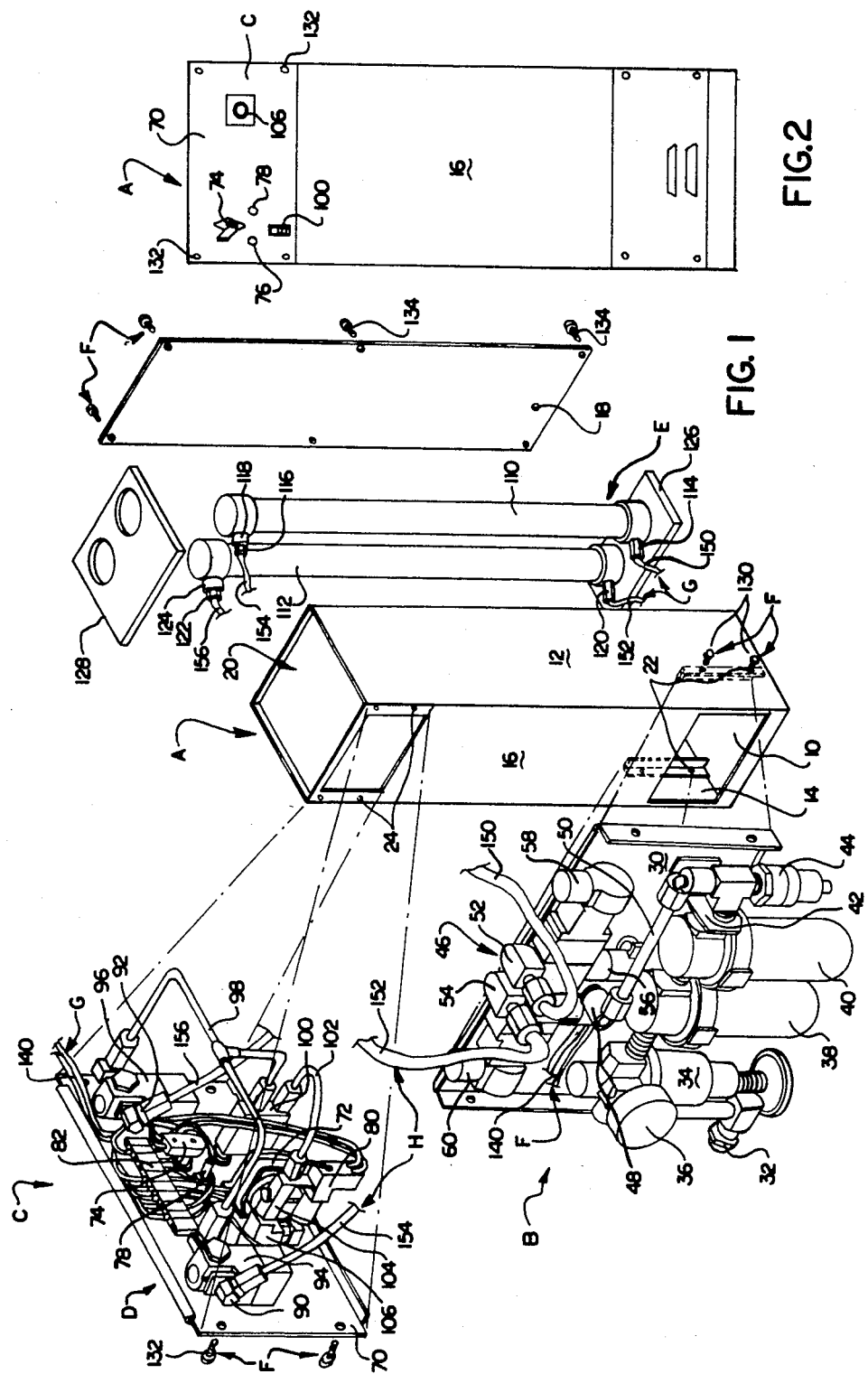

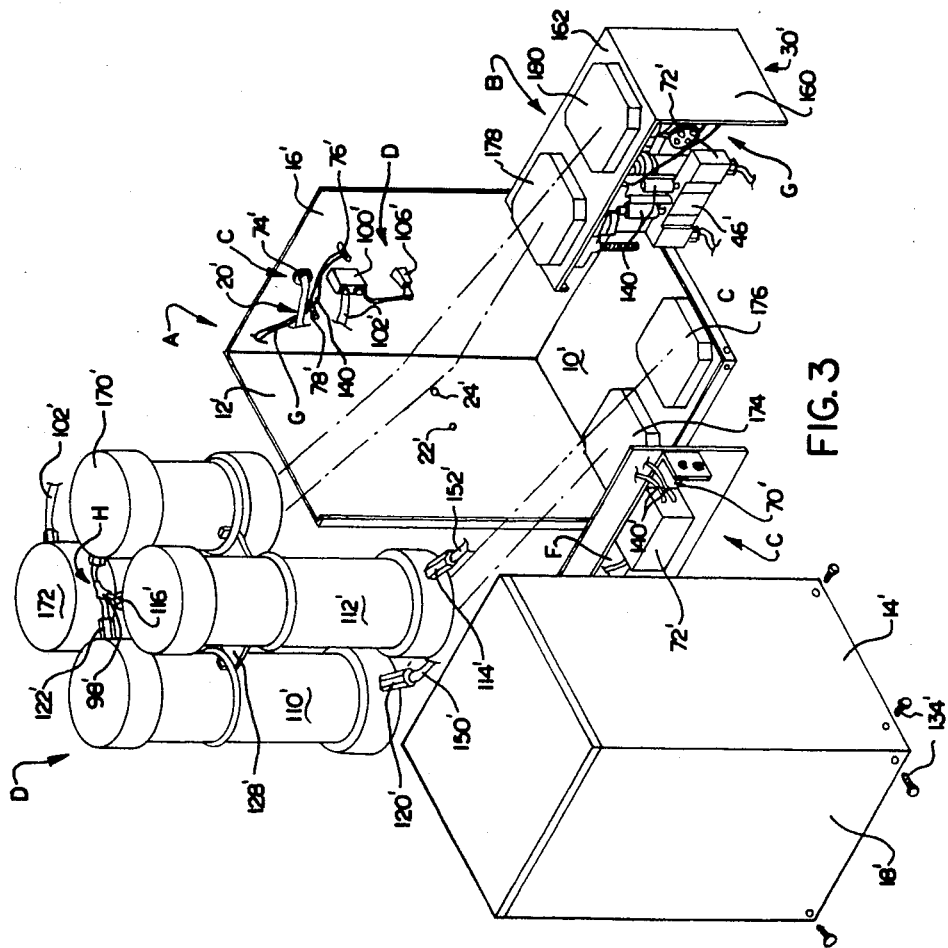
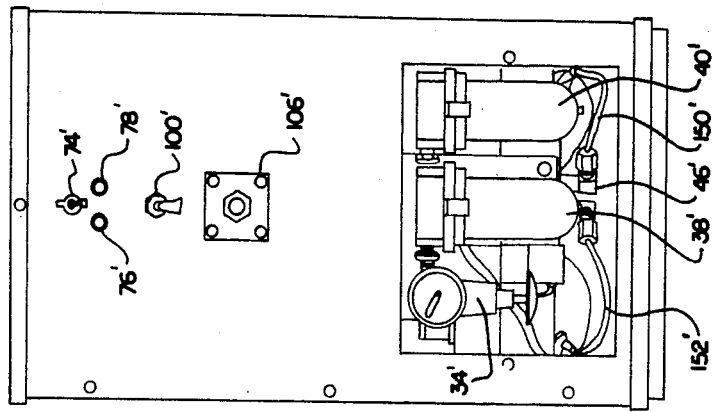

MODULAR OXYGEN GENERATOR

This is a continuation, of application Ser. No. 521,711 filed Aug. 9, 1983, now abandoned.

BACKGROUND OF THE INVENTION

The present invention relates to apparatus for molecularly separating gases and modular design. The present invention finds particular application in modular cabinetry and component arrangement schemes for oxygen generators and is described with particular reference thereto. It is to be appreciated, however, that the invention is also applicable to various gas separation devices and the like.

Heretofore, oxygen generators had been constructed in a chain link manner. That is, each component was attached to another which in turn was attached to another, and so on. When the oxygen generator needed rapair, the chain link construction technique rendered it difficult to diagnose the failure and difficult to repair. Repairs commonly required that a complex array of components to be disassembled, the defective component be repaired, and the complex array reassembled. A variety of specialized tools were needed for the disassembly and reassembly. Frequently, the troubleshooting and repair could not be performed in the field. Rather, the entire oxygen generator had to be returned to the factory for repair or rebuilding. This resulted in a long downtime and considerable expense.

The present invention contemplates a gas separation structure which overcomes the above-referenced problems and others, yet is serviceable and repairable in the field by an untrained operator or technician.

SUMMARY OF THE INVENTION

In accordance with the present invention, there is provided a modular gas fractioning apparatus. An incoming gas distribution module includes a distribution member which supports gas handling components normally associated with the incoming gas, such as a crossover valve, pressure regulator, and the like. A control module includes a control module member on which a cyclic timer and other electrical control components are mounted. A bed module includes at least two beds which are filled with physical separation material, such as zeolite. A housing includes a portion for mounting the distribution module, a portion for mounting the control module, and defines a region for securely receiving the bed module. A mechanical mounting assembly includes means for mechanically mounting the distribution and control modules to the corresponding portions of the housing. An electrical connection assembly includes means for electrically connecting the timer with the crossover valve and connecting other electrical components. A fluid connection assembly includes means for connecting the crossover valve with the beds and means for connecting the beds with an oxygen outlet.

A primary advantage of the present invention is that it is easy to repair and service, even in the field.

Another advantage of the present invention is that it can be field serviced quickly with a minimum of downtime.

Yet another advantage of the present invention is that it reduces manufacturing time and cost.

Still further advantages of the present invention will become apparent to others upon reading and understanding the following detailed description of the preferred embodiments.

BRIEF DESCRIPTION OF THE DRAWINGS

The invention may take form in various parts and arrangements of parts. The drawings are only for purposes of illustrating preferred embodiments of the invention and are not to be construed as limiting it.

FIG. 1 is an exploded view of a modular oxygen fractioning apparatus in accordance with the present invention;

FIG. 2 is a front view of the assembled oxygen fractioning apparatus of FIG. 1;

FIG. 3 is an exploded view of an alternate embodiment of an oxygen fractioning apparatus in accordance with the present invention; and, FIG. 4 is an assembled view of the oxygen fractioning apparatus of FIG. 3.

DETAILED DESCRIPTION OF THE PREFERRED EMBODIMENTS

With reference first to the FIGURES, the gas fractioning apparatus includes a housing or cabinet A in which the various gas fractioning components or modules are located. A gas distribution module or assembly B which includes the components for handling and distributing incoming gas is mechanically mountable within the housing A. A control module or assembly C which contains the appropriate control components for gas fractioning is similarly mountable within the housing A. An oxygen or fractioned gas outlet module or assembly D which includes the appropriate fluid handling components for handling the oxygen or other separated gas is mounted with the control module C. A bed module or assembly E for fractioning the received gas is also mounted in the housing. A mechanical mounting assembly F removably mounts the various modules within the housing. An electrical connection assembly G provides electrical connection between the electrical components of the various modules or assemblies. A fluid connection assembly H provides fluid connections between the fluid handling components of the various modules.

Referring first to the embodiments of FIGS. 1 and 2, the housing A includes a base 10, a pair of fixed sidewalls 12 and 14, and a face wall 16. A rear wall 18 is selectively removable to expose a bed receiving region 20. The housing has a distribution module mounting portion 22 including a pair of mounting apertures, a flange, or the like. Similarly, the housing includes a control and gas outlet module mounting portion 24 including a pair of flanges or the like.

The gas distribution module B includes a distribution module member or panel 30 which is dimensioned to be mounted in the distribution module mounting portion 22 of the housing. An incoming air fitting 32 is adapted to be connected with a hose from an air compressor or other source of gas under pressure to be separated. A pressure regulator valve 34 is connected with the inlet fitting 32 to control the pressure of the incoming gas and operatively mounted with the distribution panel 30. A pressure indicator 36 provides a visual indication of the regulated pressure. A water trap or filter 38 is disposed in fluid communication with the regulator valve to remove water from the incoming gas. A second, finer filter 40 removes oil, dust, and other contaminates from the incoming gas. The filters are operatively mounted on the panel 30 by a bracket 42 or the like. A pressure relief valve 44 vents the compressed gas to the atmosphere if the pressure should exceed a preselected maximum, e.g. 85 pounds. The relief valve is connected in fluid communication between the filters and a crossover valve 46.

The crossover valve 46 includes a first or inlet port 48 for receiving compressed air to be separated. Preferably, the first port 48 and the relief valve 42 have quick connect fittings to facilitate connecting a flexible hose 50 therebetween. The crossover valve further has a second port 52, a third port 54 and a fourth port means 56. A pair of electrical, solenoid actuators 58 and 60 are selectively actuated to cause the crossover valve to assume one of at least two states. In a first state, the first port 48 is fluidically connected with the second port 52 and the third port 54 is fluidically connected with the fourth port 56. In the second state, the first port 48 is fluidically connected with the third port 54 and the second port 52 is fluidically connected with the fourth port 56. In this manner, the compressed, incoming gas is selectively switched by the crossover valve to one of the ports 52 and 54 and the other of the ports 52 and 54 is connected with the fourth port 56 for discharge to the atmosphere. Preferably, the crossover valve has a third state in which flow between any of the ports is blocked.

The control assembly module C includes a control module panel or member 70 which is dimensioned for selective mounting in the control module receiving portion 24 of the housing. A cyclic electrical timer 72 which is mounted on the control panel produces at least two outputs with cyclic periodicity. More particularly, the cyclic timer 72 produces actuating electrical signals for causing the crossover valve solenoid actuators 58 and 60 to change between the first and second states with a preselected, regular periodicity. An electrical on-off switch 74 selectively turns the electrical control circuitry on and off. A pair of indicator lamps 76, 78 provide a visual display of the state of the system. A pressure sensing switch 80 monitors the pressure of output gas. In the preferred embodiment, the pressure sensing switch 80 causes the electrical control system to stop the gas separation in response to the output pressure reaching a preselected pressure level. More specifically, in response to the high pressure, the pressure sensing switch 80 causes the crossover valve 46 to assume the third state in which all fluid flow is blocked and causes a corresponding one of the indicator lamps 76, 78 to be illuminated. An electrical connection bus 82 facilitates electrical interconnection of the control components.

The oxygen outlet assembly D includes a first quick connect fitting 90 and a second quick connect fitting 92 which are adapted to receive oxygen or other separated gas from the bed assembly E. A pair of electrically controlled shut-off valves 94, 96 which are mounted to the control panel 70 selectively enable and block gas from passing to or from the bed assembly. The shut-off valves are selectively actuated by the pressure responsive switch in response to the high sensed pressure to hold the oxygen in the beds. In this manner, when an external oxygen reservoir is filled, the separation of oxygen and nitrogen is temporarily stopped by the pressure responsive switch. The crossover valve 46 in its third state and the shut-off valves 90, 92 lock oxygen in the beds. A Y-tube 98 is connected by quick connect fittings with the shut-off valves 94 and 96 and with a fluid flow control valve 100. The fluid control valve 100 is mounted to the control panel to be manually operated for selectively permitting and blocking the flow of fluid therethrough. The fluid control valve 100 is connected by a length of tubing 102 having quick connect fittings with a check valve 104 and an oxygen outlet fitting 106. The check valve 104 prevents contaminants from entering the system from the outlet and serves as a firewall to prevent an external fire entering from the outlet. The check valve and outlet fitting are mounted on and pass through the control panel 70. The pressure sensing switch 80 is connected with the outlet fitting 106 to sense the pressure thereat.

The bed assembly E includes a first bed 110 which is filled with a physical separation material such as zeolite and a second bed 112 which is also filled with the physical separation material. The bed assembly has a first quick connect fluid connection or fitting 114 at one end of the first bed and a second quick connect connection or fitting 116 at its other end. A fluid restrictor 118 is disposed between the interior of the first bed and the second quick connect connection or fitting. A third quick connect fluid connection or fitting 120 is disposed adjacent a first end of the second bed and a fourth quick connect connection or fitting 122 adjacent its second end. A second fluid restrictor 124 is fluidically disposed between the second bed and the fourth quick connect fluid connection 122. A pair of spider or mounting plates 126 and 128 are connected with the first and second beds to fix their relative position. The mounting plates have exterior dimensions that are snugly received in the bed receiving region 20 to mount the bed module securely in the housing.

The mechanical mounting assembly F includes means 130 for mounting the distribution module panel 30 to the distribution module mounting portion 22 of the housing, such as a plurality of sheet metal screws. A means 132, such as a second plurality of sheet metal screws, mechanically mounts the control panel 70 with the control module mounting portion 24 of the housing. The bed assembly mounting plates 126 and 128 fit snugly in the bed receiving region and are held in place by the rear panel 18 which, in turn, is secured by a third plurality of sheet metal screws 134.

The electrical connecting assembly G includes a wiring harness 140 for electrically connecting the cyclic timer 72 and the solenoid crossover valve actuators 58 and 60. Further, electrical leads are adapted to be connected with a wall plug or other source of electrical power.

The fluid connection means H includes a plurality of flexible tubes with quick connect fittings at their ends for selectively providing fluid connection between the various fluid connection components. A first crossover valve to bed assembly connecting means or tubing length 150 is selectively connected between crossover valve second port 52 and the bed assembly first fluid connection 114. A second crossover valve to bed assembly connecting means or tubing length 152 selectively connects the crossover valve third port 54 and the bed assembly third connection 120 with quick connect fittings. A first bed to outlet fluid assembly fluid connection means or tubing length 154 selectively connects the bed assembly second fluid connection 116 and the first fitting 90. A second bed to fluid outlet assembly connecting means or tubing length 156 selectively connects the bed assembly fourth fluid connection 122 and the second fitting 92 with quick connect fittings.

In operation, an air compressor or other source of gas to be separated under pressure is connected with the fluid inlet fitting 32. The pressure of the incoming gas is regulated with the regulator valve 34. The crossover valve 46 cyclically supplies the incoming gas to one of the beds and connects the other bed with the atmosphere. The crossover valve cycle time is calculated to permit the nitrogen adsorbing capacity of one bed to become saturated. The oxygen which passes through the bed is conveyed in part to the fluid control switch 100 and in part to the other bed. The oxygen passing to the other bed flushes nitrogen therefrom through the crossover valve fourth port 56. The cycle timer cyclically reverses beds such that each alternately separates oxygen and is flushed.

An oxygen reservoir or surge tank is connected with the oxygen outlet 106 to provide a source of oxygen for welding equipment, brazing equipment, or the like. When the oxygen tank becomes filled and pressurized to a preselected pressure, the pressure sensing switch 80 is actuated. The pressure sensing switch 80 stops the oxygen separation process until the pressure in the oxygen tank drops a preselected amount. More particularly, the pressure switch 80 causes the crossover valve 46 and the shut-off valves 94 and 96 to block the flow of oxygen out of the beds. One of the lamps 76, 78 is illuminated to indicate that the system is actuated but is not currently fractioning oxygen.

If a component of the unit should fail in the field, the service manual provides a series of checks and conditions to monitor. From these checks, one can isolate which of the modules or assemblies is responsible for the failure. An order for a replacement module is made by telephone and the defective module is returned. The replacement module is sent by overnight courier and installed with only a screwdriver. In this manner, the need for a service call can be eliminated, yet overnight repair service provided.

FIGS. 3 and 4 illustrate another embodiment of the present invention in which like elements are denoted by the same reference numeral but followed by a prime ('). The housing A has a first housing portion including a base 10' to which a sidewall 12' and a face wall 16' are connected. A second housing portion includes a connected sidewall 14' and rearwall 18' which are selectively connectable with the first housing portion. The housing defines apertures for receiving sheet metal screws or the like which define distribution and a control module mounting portions 22', 24'.

The gas distribution module B includes a mounting member or plate 30' on which are mounted an air regulator 34', filters 38' and 40', and a crossover valve 46' as discussed in conjunction with the embodiment of FIGS. 1 and 2. The distribution mounting member 30' includes an L-shaped portion including a side support wall 160 and a shelf 162.

The control assembly C includes a cyclic timer and control circuit 72'. The cyclic timer includes leads for connection with the crossover valve 46', with an on-off switch 74', and with a source of electrical power, and with indicator lamps 76' and 78'. The timer and crossover control circuit is mounted on the distribution mounting member 30'.

An oxygen outlet assembly D includes a fluid control valve 100' which is connected between the surge tanks and a fluid outlet fitting 106'. The oxygen outlet assembly is mounted on housing wall 16' which functions as an outlet assembly mounting member.

The bed assembly E includes a first bed 110' and a second bed 112' which are filled with zeolite or other physical separation material. The beds have inlets 114' and 120' which are connected with the crossover valve 46'. Bed assembly outlets 116' and 122' are connected by a Y-tube 98' with an oxygen reservoir or surge tank 170 and 172. A spider structure 128' connects the first and second beds and the surge tanks into a single unit or module which is dimensioned to match the bed receiving region 20' of the housing. More particularly, the beds are seated on bed support seats 174 and 176 of the bottom wall and the surge tanks rest on seats 178 and 180 of the shelf 162. The beds and surge tanks extend between the seats and the top wall of the housing and between the front, rear, and sidewalls of the housing such that the bed module E is received securely therein.

The mechanical mounting assembly F includes a plurality of sheet metal screws 130', or the like, for mounting the distribution module and control module panels to the housing. Additional sheet metal screws 134' or the like are provided for connecting the first and second housing portions.

An electrical connecting assembly G includes a wire harness 140' for connecting the cyclic timer and control module 72' with an on-off switch 74', the indicator lamps 76' and 78', and the crossover valve 46'.

The fluid connection means H includes a plurality of flexible tubes with quick connect fittings at their ends. Tubing lengths 150' and 152' are connected between the crossover valve 46' and the beds 110' and 112'. The Y-tubing assembly 98' connects the beds with a surge tank and an outlet line 102' connects the surge tanks with the fluid control switch 100'.

The invention has been described with reference to the preferred embodiment. Obviously, alterations and modifications will occur to others upon reading and understanding the preceding detailed description. It is intended that the invention be construed as including all such alterations and modifications insofar as they come within the scope of the appended claims or the equivalents thereof.

Having thus described the preferred embodiments of the invention, the invention is now claimed to be:

1. A compact, modular oxygen separating apparatus comprising:
   (a) a housing which surrounds and defines an interior housing space, the housing including a distribution module mounting means, an electrical control panel mounting means, and a molecular seive bed supporting means;
   (b) a gas distribution module including:
      (i) a distribution module mounting panel which is configured to be selectively mounted in and removable from the housing distribution module mounting means,
      (ii) a pressure regulator means for regulating incoming gas pressure, the pressure regulator means being mounted to the distribution module mounting panel for mounting in and removal from the housing therewith,
      (iii) a water trap means for removing water from the incoming gas, the water trap means being mounted to the distribution module mounting panel to be mounted in and removed from the housing therewith and being operatively connected in pneumatic communication with the pressure regulator means,
      (iv) a filter means for filtering the incoming gas, the filtering means being mounted to the distribution module mounting panel to be mounted in and removed from the housing therewith and being connected in pneumatic communication with the pressure regulating means and the water trap means, (v) a crossover valve means for alternately channelling the incoming gas to one of first and second crossover valve outlet ports and for operatively connecting the other of the first and second crossover valve outlet ports with a waste gas discharge port, the crossover valve means being mounted to the distribution module mounting panel to be mounted in and removed from the housing therewith and being connected in pneumatic communication with the pressure regulator means, the water trap means, and the filter means to receive the incoming gas therefrom, whereby, the gas distribution module including the pressure regulator means, the water trap means, the filter means, and the crossover valve means is mounted in and removed from the housing as a single unit;

(c) a control module including:

(i) a control module mounting panel which is configured to be selectively mounted in and removable from the housing control panel mounting means, (ii) a plurality of electrical components including an electrical timer means for controlling operation of components of the oxygen separating apparatus including cyclical operation of the crossover valve means, the electrical components being mounted on the control module mounting panel and being electrically interconnected with each other, such that the electrical components are mountable in and removable from the housing as a unit; and, (d) a bed module including a plurality of beds of physical separation material that are selectively mountable in and removable from the housing molecular sieve bed supporting therefore as a unit, the beds being pneumatically connected with the crossover valve means first and second outlet ports to receive incoming gas therefrom and with an oxygen outlet for directing oxygen rich gas thereto.

2. The apparatus as set forth in claim 1 further including an oxygen outlet assembly including an electrically actuated shut-off valve means and a check valve pneumatically connected between the beds and the oxygen outlet to control the discharge of oxygen rich gas therefrom.

3. The apparatus as set forth in claim 2 further including a pressure sensing means operatively connected adjacent the oxygen outlet for sensing oxygen pressure thereadjacent, the electrical control components being operatively connected with the pressure sensing means and the shut-off valve means such that the shut-off valve means is caused to block the flow of oxygen therethrough in response to the pressure sensing means sensing a preselected pressure.

4. The apparatus as set forth in claim 1 wherein the housing includes a top wall, a bottom wall, and four side walls, a portion of the housing bottom wall defining the molecular seive bed supporting portion, and further including a bed connecting means for interconnecting the plurality of beds such that the bed module has a width which is substantially the same as a width between an opposite pair of the side walls, whereby the housing bottom wall supports the bed module and housing side walls lock the bed module in place.

5. The apparatus as set forth in claim 1 wherein electrical components of the control module, the crossover valving means, and other electrically controlled components each include electrical friction connector portions and further including a wiring harness having mating electrical friction connector portions which are manually interconnectable and disconnectable with the control module electrical friction connector portions, crossover valving means electrical friction connector portions, and other electrical component electrical friction connector portions, whereby the wiring harness is connectable and disconnectable without tools.

6. The apparatus as set forth in claim 1 wherein the crossover valving means first and second outlet ports are interconnected with quick connect fluid connector portions and the beds are connected with quick connect fluid connector portions and further including a fluid conduit assembly having a plurality of fluid conduits and quick connect fluid connecting portions which are manually connectable and disconnectable with the crossover valving means and bed quick connect fluid connector portions, whereby the fluid conduit assembly is connectable and disconnectable without tools.

7. A modular gas separation apparatus comprising:

a gas distribution module including a pressure regulator, filter and crossover valve connected pneumatically in series, the crossover valve having at least first and second outlet ports, the gas distribution module further including quick connect fluid connector fittings operatively connected with the first and second outlet ports for facilitating the manual interconnection of conduits for conveying gas thereto and conduits for conveying gas therefrom, including electrical friction connection portions operatively connected with the crossover valve for facilitating the ready, manual electrical connection of an electrical wiring harnass therewith, and including a distribution module mounting means which is selectively mountable and removable from a housing, the pressure regulator, filter, and crossover valve being connected with the distribution module mouting means such that the gas distribution module is selectively mountable in and removable from the housing as a unit to facilitate ready replacement;

an electrical control module including electronic components for controlling the gas distribution and other modules, the control module including electrical friction connection portions for facilitating the ready manual electrical interconnection of the wiring harness therewith, the electronic components being supported by a control module mounting means which is selectively mountable in and removable from the housing to facilitate ready replacement of the electrical control module as a unit;

a bed module including at least a pair of beds containing a physical separation material, a bed interconnecting structure for physically coupling the beds to facilitate handling of the beds as a unit, and a plurality of quick connect fluid connector fittings for facilitating ready manual interconnection and disconnection of fluid conduits carrying gas from the gas distribution module thereto and of fluid conduits carrying separated gas therefrom, the bed module being selectively mounted in and removable from a bed supporting means within the housing as a unit; and, a flexible conduit assembly having quick fluid connector connect fittings for facilitating ready, manual interconnection and disconnection with the quick connect fluid connector fittings of at least the gas distribution and bed modules, whereby upon identifying a malfunction in any one of the gas distribution, control, and bed modules, the defective module can be readily, manually disconnected electrically and fluidically, removed from the housing as a unit, and a replacement module can be readily mounted in the housing and manually connected electrically and fluidically with the other modules to facilitate repair of the apparatus without complete replacement thereof.

8. The apparatus as set forth in claim 7 further including a gas reservoir pneumatically connected downstream from the beds, the interconnecting structure further interconnecting the gas reservoir with the beds such that the gas reservoir and beds are mountable in and removable from the housing as a unit.

9. The apparatus as set forth in claim 7 wherein the interconnecting structure includes a pair of plates, each having bed mounting means for mounting the beds thereto.

10. The apparatus as set forth in claim 7 wherein the interconnecting structure is a spider structure including a central portion and a plurality of bed encircling portions each engaging the periphery of one of the beds, the central portion fixing the relative position of the beds.

11. The apparatus as set forth in claim 10 further including at least one tank for receiving separated gas, the spider including an encircling portion which engages the periphery of the tank.

* * * * *